US006333919B2

(12) United States Patent
Gaffney

(10) Patent No.: US 6,333,919 B2
(45) Date of Patent: *Dec. 25, 2001

(54) METHODS AND ARRANGEMENT IN A COMMUNICATION SYSTEM

(75) Inventor: Kevin Gaffney, Grenoble (FR)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/955,088

(22) Filed: Oct. 21, 1997

(30) Foreign Application Priority Data

Oct. 29, 1996 (SE) .................................................. 9603948

(51) Int. Cl.⁷ ........................... H04L 12/16; H04L 12/28; H04M 3/42; H04N 7/14
(52) U.S. Cl. .......................... 370/254; 370/259; 370/410; 379/210; 348/17
(58) Field of Search ..................................... 370/236, 254, 370/259, 260, 261, 262, 356, 389, 398, 401, 428, 466, 487, 410; 379/211, 210, 212, 60, 67, 88.07, 100, 357, 202, 201; 348/6, 7, 12, 13, 14, 17

(56) References Cited

U.S. PATENT DOCUMENTS

| | | | |
|---|---|---|---|
| 4,837,798 | 6/1989 | Cohen et al. | 379/88 |
| 5,243,645 | * 9/1993 | Bissell et al. | 379/211 |
| 5,315,636 | 5/1994 | Patel | 379/58 |
| 5,333,266 | 7/1994 | Boaz | 395/200 |
| 5,497,373 | 3/1996 | Hulen et al. | 370/79 |
| 5,524,137 | * 6/1996 | Rhee | 379/67 |
| 5,724,407 | * 3/1998 | Bruno et al. | 379/67 |
| 5,751,791 | * 5/1998 | Chen et al. | 379/88 |
| 5,884,032 | * 3/1999 | Bateman et al. | 395/200.34 |
| 5,982,856 | * 11/1999 | Cohn et al. | 379/88.06 |

FOREIGN PATENT DOCUMENTS

| | | | |
|---|---|---|---|
| 0 484 067 | 5/1992 | (EP) | H04M/3/42 |
| 0 662 763 | 7/1995 | (EP) | H04M/3/50 |
| WO96/19068 | 6/1996 | (WO) | H04M/1/64 |

* cited by examiner

Primary Examiner—Alpus H. Hsu
Assistant Examiner—Duc Ho
(74) Attorney, Agent, or Firm—Burns, Doane, Swecker & Mathis, L.L.P.

(57) ABSTRACT

The present invention relates to methods and an arrangement for receiving, storing, and originating multimedia messages. An incoming message is transmitted to an in/out interface via a transport network. The message is stored in a message store, translated in a translation unit into a format adapted to the presentation capabilities of receiver's current terminal and delivered to the receiver over a user access interface and an access network with guidance from a location database. Earlier received messages, which are kept in the message store, can be accessed and edited via any standardized access network using media translation in the translation unit. A multimedia message is originated by a user in the system via any access network and the user access interface. The message is then stored in the message store, translated in the translation unit, and delivered to the destination through the in/out interface and an appropriate transport network.

19 Claims, 4 Drawing Sheets

METHODS AND ARRANGEMENT IN A COMMUNICATION SYSTEM

BACKGROUND OF THE INVENTION

The present invention relates to methods in a communication system which allow messages including multiple message types to be stored and delivered to and from a variety of terminal types over a plurality of interconnecting networks.

The invention also relates to an arrangement for executing said methods.

STATE OF THE ART

A communication system is previously known by U.S. Pat. No. 4,837,798 in which one single electronic mailbox can receive and store different types of messages, such as voice or data messages. The message recipient has a single point of contact with the system where all messages can be scanned/viewed, which is pre-selected by the recipient. If necessary the communication system performs media translation from one media to another. Furthermore, one individual message may be composed of parts that use different native media.

U.S. Pat. No. 5,333,266 discloses a method and an apparatus for integrating mail from a plurality of mail servers handling different media types such as text, voice, facsimile, video and image. Various terminal interfaces, e.g. computers or telephones, can be used to collect, generate and act upon a message of any media type. For this purpose the apparatus comprises translation modules for bi-directional translation between speech and text and between optical character recognition and text.

From EP-A-0,662,763 is known an integrated electronic message system for storage and retrieval of electronic messages of different data types such as voice, video, text or facsimile. Electronic messages directed to a specific destination are placed into a single electronic mailbox, irrespective of the data type of the electronic message. Each message may consist of several message bodies, which contain message parts of different data types. When a stored message is retrieved from a certain endpoint device the format of the message is adapted as much as possible to what kinds of media the specific endpoint device can reproduce. If, for instance, the endpoint device is an ordinary telephone message bodies representing sounds may be presented directly, text bodies containing converted into voice data and message bodies carrying video or image data are eliminated.

In the solution according to U.S. Pat. No. 4,837,798 the recipient only has one single point of contact with the communication system. The system is thus incapable of handling e.g. mobile users roaming from one point to another. Incoming messages are always delivered to a default terminal regardless of the user being there or not.

U.S. Pat. No. 5,333,266 suggests a distributed message translation system which implies a message translation module in each of the interconnected networks. All message translation modules keep a copy of every message sent. This solution consumes considerable resources that could be used for alternative purposes.

The electronic message transfer system of EP-A-0,662,763 only translates header and title information. Furthermore, messages are always pre-translated, i.e. if the presentation capabilities at the current location of a user demands a message to be translated before delivery the message will be translated directly and stored centrally in a translated format. Since translation is performed when a message is received and not when a message is actually retrieved some translations may prove to be unnecessary. This is the case, for instance, when a user before accessing a certain message changes his/her terminal to a terminal which can access the message in its original format.

DISCLOSURE OF THE INVENTION

An object of the present invention is thus to provide one common message store which may be accessed not only from one, but from multiple terminal and network types.

It is another object of the present invention to link the message store to a user location database, which keeps a record of every user's current or latest registered location.

A further object of the present invention is to minimise the total need for message translation due to limited presentation capabilities of one or more specific user terminals.

Yet a further object of the present invention is to minimise the total need for message translation due to limited transmission capabilities of one or more specific interconnecting telecommunication networks.

These and other objects are met by the present invention according to which the translation is carried out in accordance with terminal type-data stored in the location database. The automatic translation procedure is complemented by a dynamic dialogue between the user and the messaging system. The dynamic dialogue gives the user an opportunity to notify the system of any additional multimedia presentation capabilities that his/her terminal may have and/or to inform the system that his/her terminal cannot handle a particular media format, but another variation of this format and/or to choose an alternative terminal which he/she may also have access to at his/her current location and which is capable of presenting the multimedia message in preferred format or formats.

The messaging system of the present invention sees to it that every multimedia message is delivered to the intended recipient of the message regardless of his/her current location.

Furthermore, the messaging system according to the invention automatically detects the optimal translation of said message into an alternate media, when message translation is necessary.

According to a first aspect of the invention, when multimedia message is addresses to a user in the messaging system, the incoming message is stored in a multimedia message store. A first notification signal for this incoming message is diverted from an address stated in the address field of the message to the messaging system. A second notification signal is then sent from the messaging system to a location given by an address stored. Subsequent to the user being notified of the incoming multimedia message by the second notification signal a connection is established between the user location and the messaging system. This connection is set up by means of the dynamic dialogue described above. All parts of the multimedia message which need and can be translated into another media format in order to be presented at the current user terminal are translated accordingly. The translated parts and the parts of the multimedia message that do not need to be translated are finally transferred to and presented at the user terminal. If limitations in the presentation capabilities of the user terminal make it necessary to exclude one or more parts of a certain multimedia message, this fact is preferably indicated to the user along with the presentation of the message. A method according to this first aspect of the invention is hereby characterised by what is apparent from claim 1.

According to a second aspect of the invention, when a user in the messaging system wishes to review, edit or delete, i.e. act upon, a specific multimedia message which is held in the multimedia message store he/she contacts the messaging system from an arbitrary terminal connected to any telecommunication network. After that the presentation capabilities at the particular user location are established through a dynamic dialogue between the user and the messaging system. Then the multimedia message, translated into a format best possibly suited for the given presentation capabilities, is delivered from the messaging system to the user via the above mentioned network.

Naturally, the user is also given an opportunity to perform any modifications of the contents of the multimedia message and Therefore, according to a third aspect of the invention, a multimedia message is originated by a user in the messaging system according to the following procedure. The user connects to the messaging system from any terminal. The terminal may be connected to any telecommunications network using arbitrary standardised protocols. First, the multimedia message generation capabilities of the terminal are established through a dynamic dialogue between the user and the messaging system. Second, a multimedia message is created by the user and sent to the messaging system. Third, the message is stored in the multimedia message store. Fourth, if the message or parts of the message need and can be translated into a format which is ideally adapted to the message presentation capabilities given by the transmission network to which the receiver is connected and by the protocol used by the message channel which is delivering the message such a translation is performed on relevant portions of the message. Finally, the message or the translated message is transmitted to the receiver.

A messaging system for carrying out the above identified aspects of the invention comprises a multimedia message store where a copy of every message sent to or from the system is kept, a translation unit for converting every message sent and received into a message format best possibly suited for the presentation capabilities of the recipient's current terminal, a database which stores address references and terminal data for all users in the system and a control unit for controlling and coordinating the other units in the system.

Thus, the proposed solution offers notification to a user when a multimedia message comes in to him/her irrespective of in which network he/she is located in or if he/she has a subscription in this network or not.

A user may also access his/her earlier received multimedia messages from more than one terminal in a multiplicity of network environments.

Furthermore, the invention provides recipients of multimedia messages with as much multimedia information as possible, regardless of the terminal type used. As the term indicates a multimedia message may include more than one message format. The invention presents message parts of a multimedia message to a recipient according to the following principle. First, presenting the as much data in its original format as possible. Second, translating remaining data into a format adapted to the presentation capabilities of the user terminal. Third, excluding possible remaining data from the message to be presented. Preferably, the recipient is notified of any possible eliminations of one or several parts of a certain multimedia message due to limitations in the presentation capabilities of the recipient's current terminal. Since the recipient always has an opportunity to define and adjust earlier definitions of the presentation capabilities of his/her current terminal in a dynamic dialogue with the system a guarantee is given that every multimedia message is optimally presented to its recipient.

The invention will now be described in further detail with help from the preferred embodiments and with reference to enclosed drawings.

PREFERRED EMBODIMENTS

Figure 1:
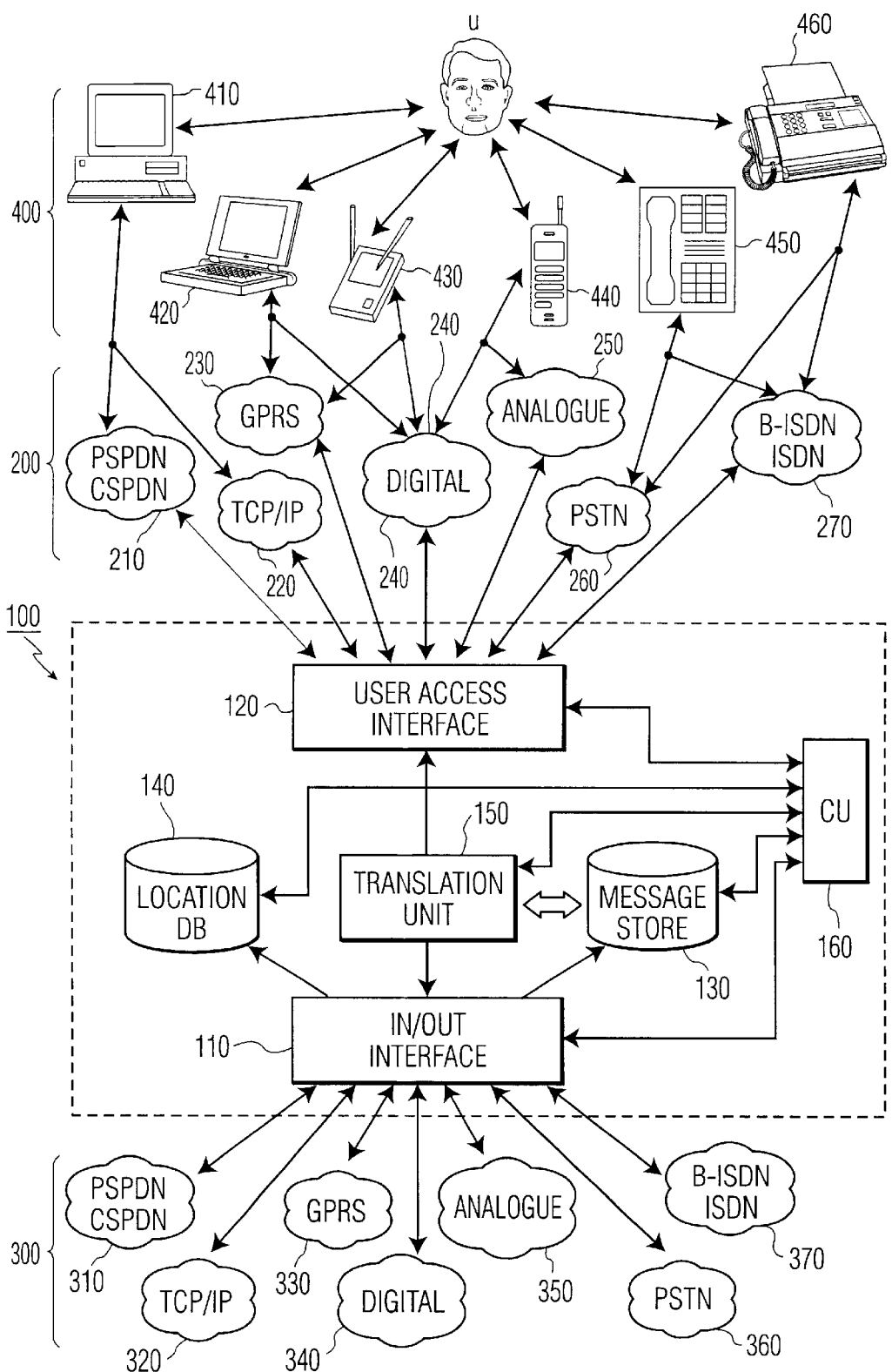
FIG. 1 shows the inventive messaging system interconnected with other communication systems.

In FIG. 1 is shown a messaging system (100) according to an embodiment of the invention. The system (100) is interconnected with at least one first accessing network (200) and one second transport network (300). A user (u) in the system (100) utilises the accessing network (200) to contact the system (100) via a terminal (400) when he/she wishes to originate a multimedia message or act upon a stored multimedia message. The accessing network (200) is also utilised by the system (100) for delivering multimedia messages to the users (u). The accessing network (200) and the transport network (300) may be any kind of communication network such as e.g. a PSPDN (PSPDN=Packet Switched Public Data Network) (210, 310), a CSPDN (CSPDN=Circuit Switched Public Data Network) (210, 310), a TCP/IP-network (TCP/IP=Transmission Control Protocol / Internet Protocol) (220, 320), a GPRS—network (GPRS=General Packet Radio Service) (230, 330), a digital radio telephone network (240, 340), an analogue radio telephone network (250, 350) , a PSTN (PSTN Public Switched Telephone Network) (260, 360), an ISDN (ISDN= Integrated Services Digital Network) (270, 370) or a B-ISDN (B-ISDN=Broadband ISDN) (270, 370). The terminal (400) can be any kind of terminal with a connection to at least one of the above mentioned accessing networks (200). Hence, the terminal (400) may, for instance, be a desktop computer or a workstation (410), a laptop computer (420) connected to a digital mobile telephone through a PCMCIA card or equipped with a radio modem, a personal digital assistant, personal intelligent communicator or network based knowledgable assistant (430), a digital or analogue mobile telephone (440), a regular desk phone, cordless telephone (450) or a facsimile machine (460).

The messaging system (100) comprises an in/out interface (110) which is connected to the transport network(s) (300) and a user access interface (120) connected to the accessing network(s) (200). The system (100) further comprises a multimedia message store (130) where copies of all messages sent to and from the messaging system (100) are held and a user location database (140) in which the network address of every user (u) in the system (100) is registered. A translation unit (150) translates multimedia messages from at least one first media format into at least one second media format if the terminals of the originator and the recipient of a particular multimedia message have different message generation and message presentation capabilities, e.g. due to the fact that they are connected to separate networks that support different protocols. Message translation may also be necessary if the originator and the recipient are connected to the same network but use different terminal types, like e.g. a regular telephone (450) and a facsimile machine (460) both connected to the PSTN (260, 360). A control unit (160) controls and supervises all other units within the messaging system (100).

Figure 2:
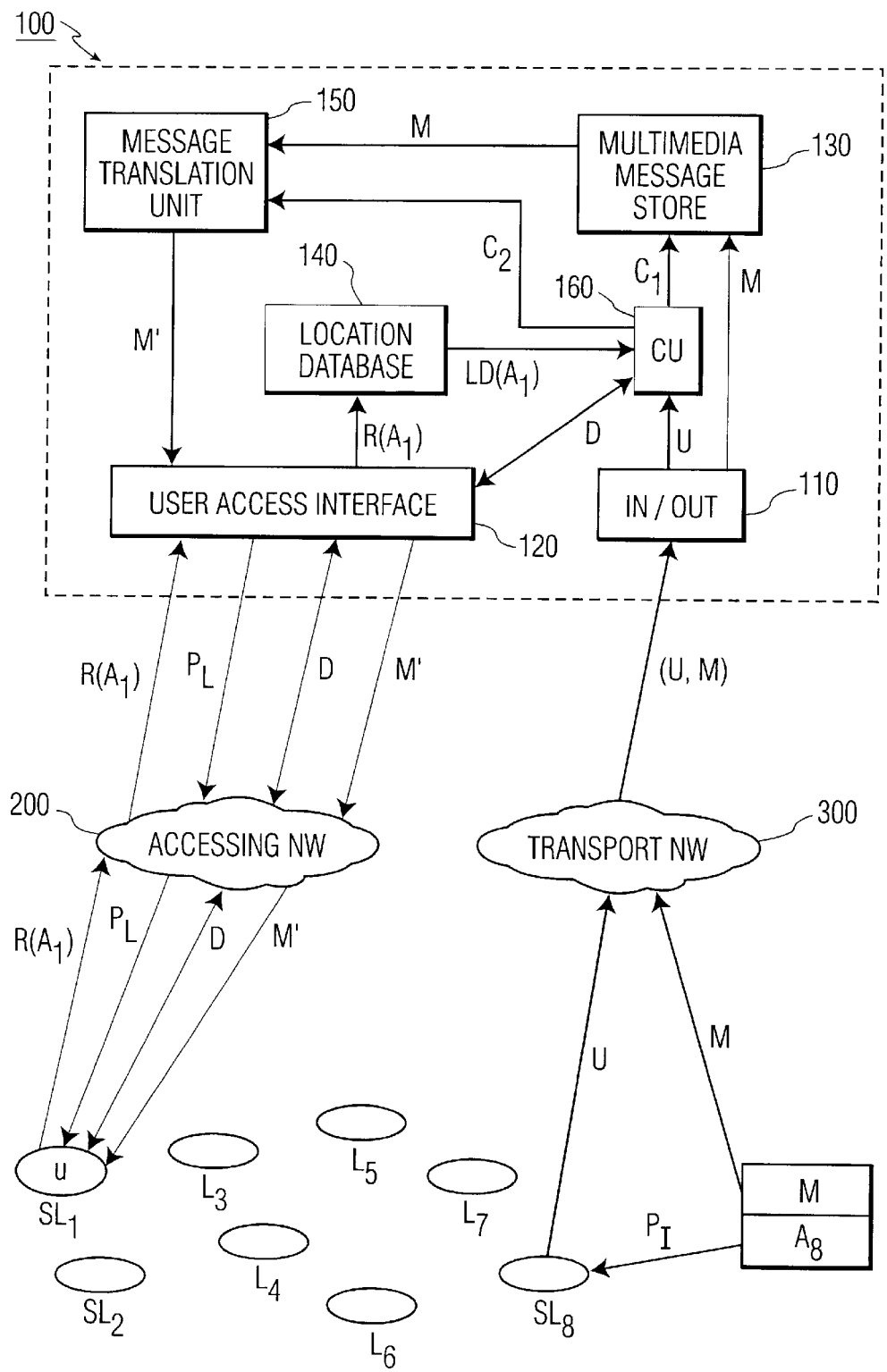
FIG. 2 illustrates the method according to the invention when a multimedia message is addressed to a user in the suggested messaging system.

FIG. 2 illustrates the method according to the invention when a multimedia message (M) is addressed ($A_8$) to a user (u) in the messaging system (100). The multimedia message (M) can be anything from an ordinary telephone call in PSTN to a multimedia mail message including hypertexts, voice messages, pictures and video sequences.

In this example we assume that the user (u) has at least two subscriptions or network identities ($A_1$, $A_8$) in one or several networks and/or network types. Each of these subscriptions or network identities ($A_1$, $A_8$) are possible primary addresses for a multimedia message (M) to the user (u), since an originator of a message (M) may address it to a destination identified by any of the known subscriptions or network identities ($A_1$, $A_8$) for that user (u).

The user (u) is now at a location ($SL_1$) which has a first address ($A_1$). When the user (u) either manually registers the address ($A_1$) of this location ($SL_1$) in the messaging system (100) or originates a message from this location ($SL_1$) via the messaging system (100) a registration message ($R(A_1)$) is sent to the system (100). The registration message ($R(A_1)$) which comprises the user identity (U), current address data ($A_1$) and if necessary information regarding terminal type and multimedia presentation capabilities is sent via an accessing network (200) to a user access interface (120) in the system (100). The registration message ($R(A_1)$) is then stored in a user location database (140).

When the multimedia message (M) addressed ($A_8$) to a location ($SL_8$), where the user (u) has a subscription, comes in an initial notification signal ($P_I$) is directed to this location ($SL_8$). However, the notification signal ($P_I$) is diverted according to a piece of information linked to the user identity (U) indicating that the user (u) is located elsewhere. This information is generated when the user (u) de-registers from a specific location ($SL_8$) and registers at another location ($SL_1$). The notification diversion may occur either directly or after a predetermined no-reply time. A signal (U, M) comprising the user identity (U) and the multimedia message (M) is sent via a transport network (300) to an in/out interface (110) in the system (100). The user information (U) is passed on to a control unit (160), which retrieves location data ($LD(A_1)$) for the user (u) from the location database (140) and the message (M) is stored in a multimedia message store (130). This procedure is controlled by a first control signal ($c_1$) from the control unit (160) to the multimedia message store (130).

The location data ($LD(A_1)$) is utilised by the system (100) when sending a notification signal ($P_L$) via the user access interface (120) and the accessing network (200) to the user's (u) current location ($SL_1$). The two addresses ($A_8$ and $A_1$) may of course be identical ($A_8=A_1$) if the user (u) now is located at the address ($A_8$) associated with the incoming message (M). If the user (u) has de-registered from the system (100) and not registered any new network identity the notification signal ($P_L$) is instead sent to a pre-defined default address. After the user (u) has replied to the notification signal ($P_L$) a connection is set up between the current user location ($SL_1$) and the system (100). This connection enables a dynamic dialogue (D) between the user (u) and the system (100) in which the message presentation capabilities at the user location ($SL_1$) are established. The multimedia message (M) is not automatically adapted to a message format that suits the user's (u) present terminal type even though this would have been possible. The reason for this is that the user (u) may also have access to an alternative terminal whose address has not been registered in the system (100) or the current user terminal has better presentation capabilities than what appears from the terminal type registered in the location database (140).

The user (u) may e.g. have a combined facsimile/telephone equipment. If this equipment has been registered as a facsimile machine and a voice message comes in the user may not want to have the message translated into text. Instead he/she wants it to be presented via the telephone set. Vice versa; if the terminal has been registered as a telephone and a fax message comes in the user does probably not want to have the message translated into a voice signal, but would rather have it presented in its original text format. Nevertheless, all multimedia message data that can be directly presented by the user's (u) registered terminal is automatically transferred via the user access interface (120) and the accessing network (200) to the user's current location ($SL_1$) for presentation.

When the presentation capabilities of the user's (u) terminal have been verified the multimedia message (M) is forwarded to a message translation unit (150) for translation of those parts of the message (M) that need and can be translated into a message format which is intelligible via the user's (u) terminal. The translation instructions are included in a second control signal ($c_2$) from the control unit (160) to the message translation unit (150). A multimedia message (M') comprising the parts of the original message (M) and/or translated parts of the original message (M) that are to be presented at the user's (u) terminal is then sent to the user access interface (120). Thereafter the message (M') is transferred to the current user location ($SL_1$) via the accessing network (200) and finally presented to the user (u).

Figure 3:
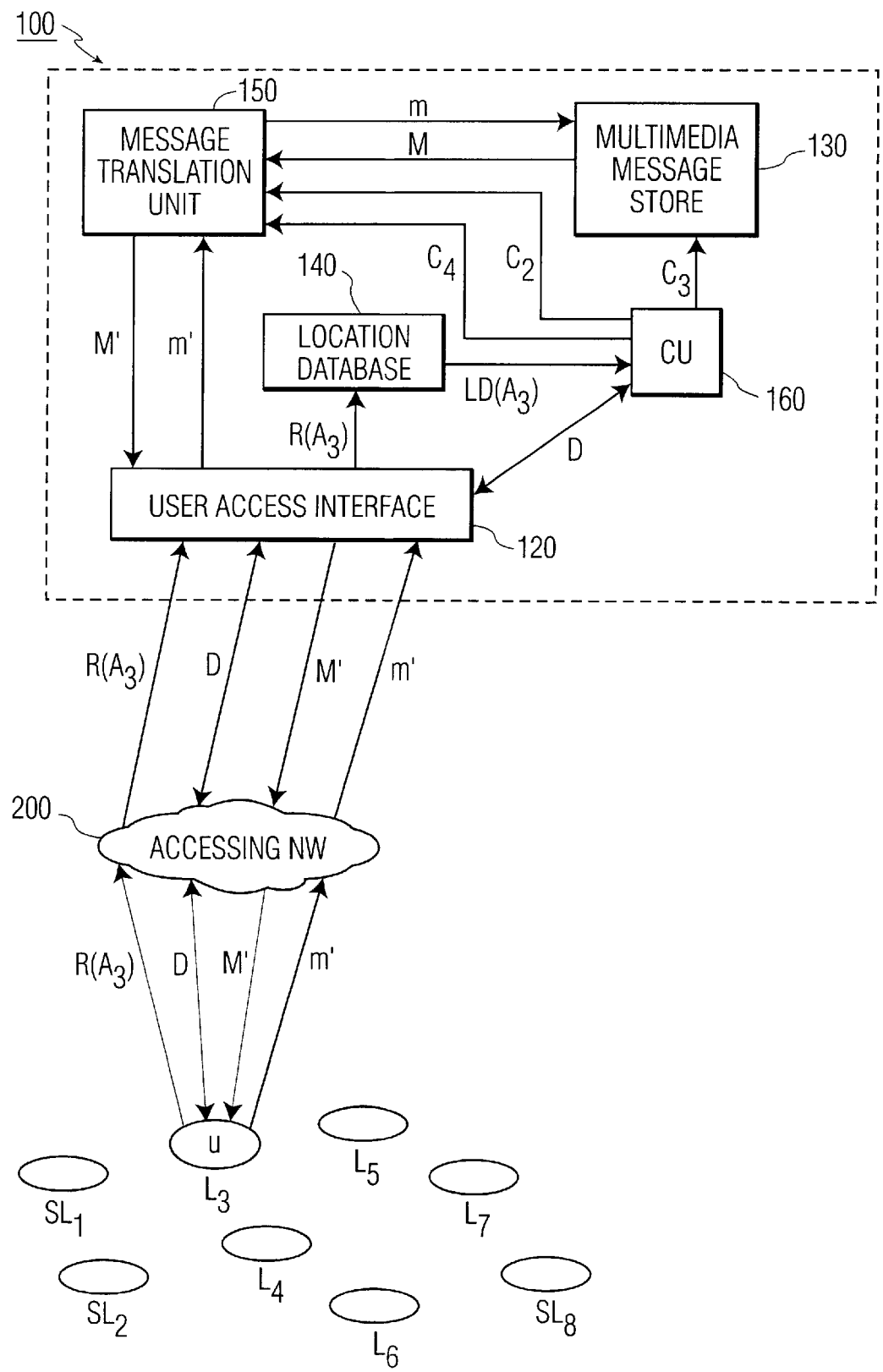
FIG. 3 illustrates the method according to the invention when a user in the suggested messaging system acts upon a stored multimedia message.

FIG. 3 depicts the method according to the invention when a user (u) acts upon a multimedia message (M) which is stored in the multimedia message store (130). Acting upon a multimedia message (M) is understood to be retrieving, editing and storing or deleting a given message (M).

A registration message ($R(A_3)$) updating the user's (u) address and terminal data is sent to the system (100) upon manual registration or after a first message has been originated from a new location ($L_3$) by the user (u). The registration message ($R(A_3)$) is forwarded to the location database (140) via an accessing network (200) and the user access interface (120).

When the user (u) wishes to retrieve a particular multimedia message (M) from the multimedia message store (130) he/she contacts the messaging system (100) via the accessing network (200) and the user access interface (120). A dynamic dialogue (D) between the user (u) and the control unit (160) in the system (100) establishes the presentation capabilities of the current user terminal. The specific message (M) is then retrieved from the multimedia message store (130) by means of a third control signal ($C_3$) from the control unit (160) to the multimedia message store (130) and sent to the message translation unit (150) for translation. The parts of the message (M) that need and can be translated into a media format which can be intelligibly presented at the user's (u) terminal are translated into such a format and the message parts that can be presented directly are passed through the unit (150) unchanged. The translation instructions are included in said second control signal ($c_2$) sent from the control unit (160) to the message translation unit (150).

A multimedia message (M') comprising the parts of the original message (M) and/or translated parts of the original message (M) that are to be presented at the user's (u) terminal is sent to the user access interface (120) and transferred to the user location ($L_3$) via the accessing network (200). The user (u) reviews the message (M') and edits desired parts of it. An edited multimedia message (m') is sent back to the system (100) for storage. The edited message (m') is conveyed to the message translation unit (150) via the accessing network (200) and the user access interface (120). The translation unit (150) translates the multimedia message (m') into its original format (m) i.e. the format in which the message (M) was stored originally, and passes the message (m) on to the multimedia message store (130). This procedure is effectuated through a fourth control signal ($c_4$) from the control unit (160) to the message translation unit (150).

Figure 4:
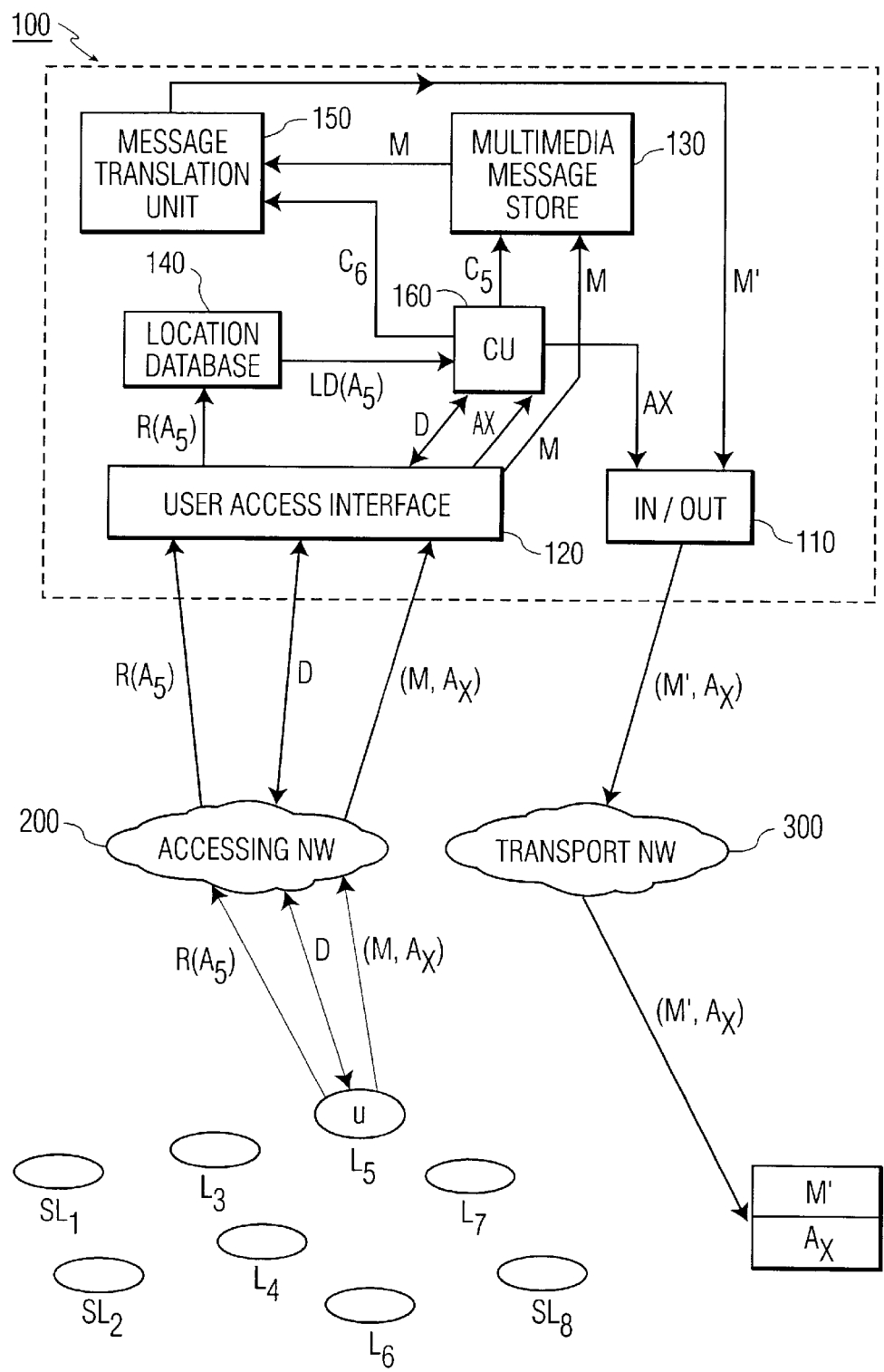
FIG. 4 illustrates the method according to the invention when a multimedia message is originated from a user in the suggested messaging system.

The method according to the invention when a multimedia message (M) is originated from a user (u) in the messaging system (100) is illustrated in FIG. 4.

As stated before, a registration message (R($A_5$)) updating the user's (u) address and terminal data is sent to the system (100) when the user (u) either manually registers this information or after a first multimedia message has been originated from a new location ($L_5$) by the user (u). The registration message (R($A_5$) is forwarded to the location database (140) via an accessing network (200) and the user access interface (120).

When the user (u) wishes to originate a multimedia message (M) from said location ($L_5$) via the messaging system (100) he/she contacts the messaging system (100) via the accessing network (200) and the user access interface (120). A dynamic dialogue (D) between the user (u) and the control unit (160) establishes the message generation capabilities of the current user terminal. A multimedia message (M) is then generated in the user terminal and sent along with a destination address ($A_x$) to the system (100) via the accessing network (200) and the user access interface (120). The message (M) is transferred to the multimedia message store (130) and the destination address ($A_x$) is passed on to the control unit (160). The control unit (160) compares the message format given by the originating terminal and the message format used in the network to which the destination address ($A_x$) belongs. If translation of some or all parts of the message (M) is necessary, those parts of the message that need and can be translated into a message format intelligible by the addressee are translated into such a format in the message translation unit (150). Those parts of the message (M) that do not need translation pass unchanged through the translation unit (150) and any possible other untranslatable parts of the message (M) are not forwarded from the multimedia message store (130) to the translation unit (150). However, if the multimedia message contains such untranslatable parts the recipient is informed of the fact along with the message. A multimedia message (M'), comprising the parts of the original message (M) and/or translated parts of the original message (M), is sent to the in/out interface (110). The receiver address ($A_x$) is forwarded by the control unit (160) and associated with the message (M') and sees to it that the multimedia message (M') is conveyed through a transport network (300) to the correct destination address ($A_x$).

The above mentioned methods all reflect different aspects of the same inventive concept regarding the usage of a multimedia message store, a message translation unit and a location database whereby users may receive, originate and act upon multimedia messages regardless of location and telecommunication network.

What is claimed is:

1. A method in a telecommunication system for receiving incoming multimedia messages, comprising the steps of:
   receiving a multimedia message addressed to a first location;
   directly diverting a first notification signal to a messaging system;
   storing said multimedia message in a multimedia message store within said messaging system;
   retrieving user location data from a user location database for a user being recipient of said multimedia message;
   notifying the user at a second location of said multimedia message in accordance with said user location data;
   setting up a connection between said second location and said messaging system, including establishing the message presentation capabilities at the second location through the connection, wherein the message presentation capabilities are selected by the user;
   translating some or all parts of said multimedia message into a message format that is intelligible at the second location if technological limitations of the message presentation capabilities at the second location so demand; and
   presenting at the second location all parts of said multimedia message or translated parts of said multimedia message that the presentation capabilities at the second location permit.

2. Method according to claim 1, wherein said user location data for a specific user in said system is entered into a location database when said user originates a multimedia message via the system from a terminal at a given location identified by said location data or when said user manually enters location data into the location database.

3. Method according to claim 2, wherein location data for a specific user is kept in the location database until the information is updated by a new entry of location data for said user either upon a new location registration or upon de-registration from the system.

4. Method according to claim 3, wherein location data representing a default address for the user is entered into the location database if said user de-registers from the system.

5. Method according to claim 1, wherein said step of presenting includes notifying the user of an exclusion of at least one portion of said multimedia message.

6. A method in a telecommunication system for acting upon a multimedia message, which includes multiple message formats, stored within a multimedia message store within a messaging system, comprising:
   setting up a connection between a user location and said messaging system according to a dynamic dialogue, in which the message presentation capabilities at the location are established through the connection, wherein the message presentation capabilities are selected by the user;
   selectively translating some or all parts of each of said multiple message formats of said multimedia message into a different message format, which is a format intelligible at the user location if technological limitations of the message presentation capabilities at the user location so demand; and
   presenting at the location all parts of said multimedia message or translated parts of said multimedia message that the presentation capabilities at the location permit.

7. Method according to claim 6, wherein said acting upon multimedia messages involves editing said multimedia message into an edited multimedia message.

8. Method according to claim 7, wherein said acting upon multimedia messages involves storing said edited multimedia message in said multimedia message store.

9. Method according to claim 6, wherein said acting upon multimedia messages involves deleting said multimedia message from said multimedia message store.

10. A method in a telecommunication system for originating multimedia messages, comprising:

setting up a connection between a user location and a messaging system according a dynamic dialogue, in which the message generation capabilities at the user location are established through the connection, wherein the message presentation capabilities are selected by the user;

generating a multimedia message, which includes multiple message formats, at the location, and transmitting said multimedia message from the location to said messaging system;

storing said multimedia message in a multimedia message store;

selectively translating some or all parts of each of said multiple message formats of said multimedia message into a different message format, which is a format intelligible at a destination location for said multimedia message if technological limitations of the message presentation capabilities at said destination location or the transmission capabilities of the connecting network or networks between the system and said destination location so demand; and transmitting translated parts and untranslated parts of said multimedia message to the destination location.

11. A messaging system for receiving, storing and originating multimedia messages comprising:

a control unit for controlling and coordinating all other units in said system;

a multimedia message store in which a copy of each multimedia message received in or sent from the system is held; and a message translation unit for translating between different multimedia message formats, wherein said system further comprises a database for storing user location data and which contents are used for locating and notifying a particular user of an incoming multimedia message and for setting up a connection between a particular user and the system via dynamic dialogue to establish the message generation capabilities selected by the user at a user location; and said message translation unit translates some or all parts of each received multimedia message into a message format that is intelligible at the user location if technological limitations of the message presentation capabilities at the user location so demand.

12. Messaging system according to claim 11, wherein the system further comprises a user access interface via which users in the system may access the system in order to originate, receive or act upon multimedia messages over an accessing network.

13. Messaging system according to claim 12, wherein said accessing network is a Packet Switched Public Data Network, a Circuit Switched Public Data Network, a network supporting Transmission Control Protocol Internet Protocol, a General Packet Radio Service network, a digital radio telephone network, an analogue radio telephone network, a Public Switched Telephone Network, an Integrated Services Digital Network or a Broadband Integrated Services Digital Network.

14. Messaging system according to claim 11, wherein the system further comprises an in/out interface via which multimedia messages are received to and originated from the system over a transport network.

15. Messaging system according to claim 11, wherein said transport network is a Packet Switched Public Data Network, a Circuit Switched Public Data Network, a network supporting Transmission Control Protocol Internet Protocol, a General Packet Radio Service network, a digital, radio telephone network, an analogue radio telephone network, a Public Switched Telephone Network, an Integrated Services Digital Network or a Broadband Integrated Services Digital Network.

16. Messaging system according to claim 11, wherein each multimedia message includes multiple message formats.

17. A method for handling a multimedia message, comprising the steps of:

transmitting a first notification signal associated with a multimedia message to a first location;

directly diverting the first notification signal to a messaging system;

storing said multimedia message in the messaging system;

retrieving user location data associated with an intended recipient of said multimedia message from a user location database;

transmitting a second notification signal associated with said multimedia message to a second location in accordance with said user location data;

sending a reply to said second notification including information regarding subsequent handling of said multimedia message:

establishing message presentation capabilities at the second location;

translating parts of said multimedia message as necessary into message formats presentable at the second location based on message presentation capabilities at the second location; and presenting all parts of said multimedia message at the second location permitted by presentation capabilities at the second location.

18. Method according to claim 17, wherein said step of storing further comprises the storing of said multimedia message within a messaging system when user is not located at the first location.

19. Method according to claim 17, wherein said step of sending a reply further comprises the step of:

receiving from user to the messaging system an indication to present said multimedia message at a third location.

* * * * *